US00RE47716E

(19) United States
(12) Reissued Patent
El-Hoyidi

(10) Patent Number: US RE47,716 E
(45) Date of Reissued Patent: *Nov. 5, 2019

(54) WIRELESS SOUND TRANSMISSION SYSTEM AND METHOD

(71) Applicant: Sonova AG, Staefa (CH)

(72) Inventor: Amre El-Hoyidi, Neuchâtel (CH)

(73) Assignee: Sonova AG, Staefa (CH)

( * ) Notice: This patent is subject to a terminal disclaimer.

(21) Appl. No.: 15/701,473

(22) Filed: Sep. 12, 2017

Related U.S. Patent Documents

Reissue of:
(64) Patent No.: 9,137,613
Issued: Sep. 15, 2015
Appl. No.: 13/577,959
PCT Filed: Feb. 12, 2010
PCT No.: PCT/EP2010/051812
§ 371 (c)(1),
(2) Date: Aug. 9, 2012
PCT Pub. No.: WO2011/098140
PCT Pub. Date: Aug. 18, 2011

(51) Int. Cl.
*G02B 6/00* (2006.01)
*H04B 7/06* (2006.01)
(Continued)

(52) U.S. Cl.
CPC ..... *H04B 7/0667* (2013.01); *H04B 7/0817* (2013.01); *H04B 7/0822* (2013.01);
(Continued)

(58) Field of Classification Search
CPC ... H04B 7/0667; H04B 7/0817; H04R 25/554
See application file for complete search history.

(56) References Cited

U.S. PATENT DOCUMENTS 6,463,295 B1 * 10/2002 Yun ..... H04L 1/20 455/522
7,058,833 B1 * 6/2006 Bremer ..... G06F 1/3203 713/324
(Continued)

FOREIGN PATENT DOCUMENTS

CA 2286522 A1 4/2001
EP 1560383 A2 8/2005
(Continued)

OTHER PUBLICATIONS

E. Vergetis et al., Packet-Level Diversity From Theory to Practice: An 802.11-Based Experimental Investigation, Mobicom '06, pp. 1-26, Slides (See Also http://repository.upenn.edu/ese-papers/).
(Continued)

*Primary Examiner* — Deandra M Hughes

(57) ABSTRACT

A system for providing sound to at least one user, having at least one audio signal source for providing audio signals; a transmission unit with a digital transmitter for wirelessly transmitting the audio signals as data packets; at least one receiver unit with at least one digital receiver for reception of the audio signals from the transmission unit; a mechanism for stimulating the hearing of the user(s) according to audio signals supplied from the receiver unit. The transmission unit transmits each data packet in a separate slot of a TDMA frame at a different frequency in a frequency hopping sequence, in at least some of the slots, the audio signals are transmitted as audio data packets, the same audio packet being transmitted at least twice in the same TDMA frame without expecting acknowledgement, and the TDMA frames
(Continued)

being structured for unidirectional broadcast transmission of the audio data packets.

26 Claims, 8 Drawing Sheets

(51) Int. Cl.
*H04B 7/08* (2006.01)
*H04R 25/00* (2006.01)

(52) U.S. Cl.
CPC ..... *H04R 25/554* (2013.01); *H04R 25/558* (2013.01); *H04R 2225/55* (2013.01)

(56) References Cited

U.S. PATENT DOCUMENTS

| | | | | |
|---|---|---|---|---|
| 7,529,565 | B2 | 5/2009 | Hilpisch et al. | |
| 7,532,610 | B2 | 5/2009 | Batra | |
| 7,606,291 | B2 | 10/2009 | Fudally | |
| 7,778,432 | B2 | 8/2010 | Larsen | |
| 8,150,057 | B2 | 4/2012 | Dunn et al. | |
| 8,169,938 | B2 | 5/2012 | Duchscher et al. | |
| 8,229,146 | B2 | 7/2012 | Nielsen | |
| 9,112,240 | B2 | 8/2015 | Zhamu et al. | |
| 9,210,519 | B2 * | 12/2015 | Callias | H02J 7/345 |
| 9,247,355 | B2 * | 1/2016 | El-Hoiydi | H04B 7/0671 |
| 9,374,648 | B2 * | 6/2016 | Callias | H04R 25/30 |
| 9,504,076 | B2 * | 11/2016 | El-Hoiydi | H04W 84/18 |
| 9,668,070 | B2 * | 5/2017 | El-Hoiydi | H04B 1/715 |
| 9,681,236 | B2 * | 6/2017 | El-Hoiydi | G10L 19/005 |
| 9,826,321 | B2 * | 11/2017 | El-Hoiydi | G10L 19/005 |
| 9,832,575 | B2 * | 11/2017 | Secall | G10L 19/167 |
| 10,084,560 | B2 * | 9/2018 | Gehring | H04R 25/554 |
| 2002/0071435 | A1 * | 6/2002 | Bolgiano et al. | 370/394 |
| 2002/0172162 | A1 | 11/2002 | Goodings | |
| 2002/0183087 | A1 | 12/2002 | Spencer et al. | |
| 2003/0045283 | A1 | 3/2003 | Hagedoorn | |
| 2003/0058829 | A1 * | 3/2003 | Batra | 370/345 |
| 2004/0081248 | A1 * | 4/2004 | Parolari | H04L 1/0003 375/259 |
| 2006/0067550 | A1 | 3/2006 | Puder et al. | |
| 2006/0148433 | A1 | 7/2006 | Welnick et al. | |
| 2007/0009124 | A1 * | 1/2007 | Larsen | 381/315 |
| 2007/0066359 | A1 * | 3/2007 | Zhuang | H04W 76/14 455/557 |
| 2007/0086601 | A1 * | 4/2007 | Mitchler | 381/79 |
| 2007/0201423 | A1 * | 8/2007 | Laroia et al. | 370/345 |
| 2008/0248758 | A1 | 10/2008 | Schedelbeck et al. | |
| 2008/0279138 | A1 * | 11/2008 | Gonikberg | H04W 8/005 370/328 |
| 2008/0279163 | A1 * | 11/2008 | Desai | H04W 52/267 370/338 |
| 2009/0245551 | A1 * | 10/2009 | Nielsen | 381/315 |
| 2010/0020863 | A1 | 1/2010 | Shi et al. | |
| 2010/0022189 | A1 * | 1/2010 | Coker | H04H 20/33 455/41.3 |
| 2010/0135512 | A1 * | 6/2010 | Haenggi | G09B 5/04 381/315 |
| 2010/0157790 | A1 * | 6/2010 | Pedersen | 370/216 |
| 2010/0157791 | A1 | 6/2010 | Casaccia et al. | |
| 2010/0158292 | A1 * | 6/2010 | Pedersen | 381/315 |
| 2011/0022916 | A1 | 1/2011 | Desai et al. | |
| 2012/0310395 | A1 * | 12/2012 | El-Hoiydi | H04W 48/16 700/94 |
| 2012/0314890 | A1 * | 12/2012 | El-Hoiydi | H04R 25/558 381/315 |
| 2014/0233527 | A1 * | 8/2014 | Gehring | H04R 25/554 370/330 |

FOREIGN PATENT DOCUMENTS

| | | | |
|---|---|---|---|
| EP | 1863320 | A1 | 12/2007 |
| WO | 2007104308 | A1 | 9/2007 |
| WO | WO2008074350 | A1 | 6/2008 |
| WO | 2008135975 | A2 | 11/2008 |
| WO | 2008138365 | A1 | 11/2008 |
| WO | WO 2010018235 | A2 | 2/2010 |

OTHER PUBLICATIONS

E. Vergetis et al., Packet-Level Diversity-From Theory to Practice: An 802.11-Based Experimental Investigation, Department of Electrical & Systems Engineering, Departmental Papers (ESE), University of Pennsylvania, Year 2006, pp. 62-73.

S. Shellhammer, Scort-An Alternative to the Bluetooth SCO Link for Voice Operation in an Interference Environment, IEEE P802.15 Working Group for Wireless Personal Area Networks, Document IEEE 802.15-01/145rl, Mar. 2001, Slides 1-27, (see http://grouper.ieee.org/groups/802/15/pub/2001/Mar01/01145r1P802-15-TG2-SCORT.pdf and http://www.mathworks.com/company/newsletters/digest/sept02/bluetooth-pt2.html#footnote).

S. Kaul et al., Effect of Antenna Placement and Diversity on Vehicular Network Communications, 4th Annual IEEE Communications Society Conference on Sensor, Mesh and Ad Hoc Communications and Networks, 2007, SECON '07, pp. 112-121.

E. Vergetis et al., Packet-Level Diversity From Theory to Practice: An 802.11-Based Experimental Investigation, Mobicom '06, pp. 1-26, Slides (See Also http://repository.upenn.edu/ese_papers/194).

Evangelos Vergetis et al., Packet-Level Diversity—From Theory to Practice: An 802.11-BASED Experimental Investigation, Department of Electrical & Systems Engineering, Departmental Papers (ESE), University of Pennsylvania, Year 2006, pp. 62-73.

Steve Shellhammer, Scort—An Alternative to the Bluetooth SCO Link for Voice Operation in an Interference Environment, IEEE P802.15 Working Group for Wireless Personal Area Networks, Document IEEE 802.15-01/145rl, Mar. 2001, Slides 1-27, (see http://grouper.ieee.org/groups/802/15/pub/2001/Mar01/01145r1P802-15_TG2-SCORT.pdf and http://www.mathworks.com/company/newsletters/digest/sept02/bluetooth_pt2.html#footnote).

The Mathworks, Accelerating the Pace of Engineering and Science, MATLAB Digest, Sep. 2002, Bluetooth Control Logic Design With Stateflow, Two Pages.

* cited by examiner

WIRELESS SOUND TRANSMISSION SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*The present application is a reissue application of U.S. Pat. No. 9,137,613 filed Feb. 12, 2010, which is a National Stage of International Application No. PCT/EP2010/051812 filed Aug. 9, 2012.*

BACKGROUND OF THE INVENTION

1. Field of the Invention

The invention relates to a system and a method for providing sound to at least one user, wherein audio signals from an audio signal source, such as a microphone for capturing a speaker's voice, are transmitted via a wireless link to a receiver unit, such as an audio receiver for a hearing aid, from where the audio signals are supplied to means for stimulating the hearing of the user, such as a hearing aid loudspeaker.

2. Description of Related Art

Presently, in such systems, the wireless audio link usually is an FM (frequency modulation) radio link. According to a typical application of such wireless audio systems, the receiver unit is connected to or integrated into a hearing instrument, such as a hearing aid, with the transmitted audio signals being mixed with audio signals captured by the microphone of the hearing instrument prior to being reproduced by the output transducer of the hearing instrument. The benefit of such systems is that the microphone of the hearing instrument can be supplemented or replaced by a remote microphone which produces audio signals which are transmitted wirelessly to the FM receiver, and thus, to the hearing instrument. In particular, FM systems have been standard equipment for children with hearing loss in educational settings for many years. Their merit lies in the fact that a microphone placed a few centimeters from the mouth of a person speaking receives speech at a much higher level than one placed several feet away. This increase in speech level corresponds to an increase in signal-to-noise ratio (SNR) due to the direct wireless connection to the listener's amplification system. The resulting improvements of signal level and SNR in the listener's ear are recognized as the primary benefits of FM radio systems, as hearing-impaired individuals are at a significant disadvantage when processing signals with a poor acoustical SNR.

A typical application of such wireless audio systems is at school, wherein the teacher uses a wireless microphone for transmitting the captured audio signals via the transmission unit to receiver units worn by the students. Since the receiver units and the respective hearing aids are usually owned by the students, the receiver units may be of different types within a class.

Another typical application of wireless audio systems is the case in which the transmission unit is designed as an assistive listening device. In this case, the transmission unit may include a wireless microphone for capturing ambient sound, in particular from a speaker close to the user, and/or a gateway to an external audio device, such as a mobile phone; here the transmission unit usually only serves to supply wireless audio signals to the receiver unit(s) worn by the user.

Examples of analog wireless FM systems particularly suited for school applications are described, for example, in European Patent Application EP 1 863 320 A1 and International Patent Application Publication WO 2008/138365 A1. According to these systems, the wireless link not only serves to transmit audio signals captured by the wireless microphone, but in addition, also serves to transmit control data obtained from analyzing the audio signals in the transmission unit to the receiver unit(s), with such control data being used in the receiver unit to adjust, for example, the gain applied to the received audio signals according to the prevailing ambient noise and the issue of whether the speaker is presently speaking or not.

In applications where the receiver unit is part of or connected to a hearing aid, transmission is usually carried out by using analog FM technology in the 200 MHz frequency band. In recent systems, the analog FM transmission technology is replaced using digital modulation techniques for audio signal transmission. An example of such digital system is available from the company Comfort Audio AB, 30105 Halmstad, Sweden under the COMFORT DIGISYSTEM® trademark.

A specific example of an analog wireless FM system particularly suited for school applications is described in International Patent Application Publication WO 2008/074350 A1, wherein the system consists of a plurality of transmission units comprising a microphone and a plurality of analog FM receiver units and wherein only one of the transmission units has an analog audio signal transmitter, while each of the transmission units is provided with a digital transceiver in order to realize an assistive digital link for enabling communication between the transmission units. The assistive digital link also serves to transmit audio signals captured by a transmission unit not having the analog transmitter to the transmission unit having the analog transmitter from where the audio signals are transmitted via the analog FM link to the receiver units.

U.S. Patent Application Publication 2002/0183087 A1 relates to a Bluetooth link for a mobile phone using two parallel antennas/transceivers, wherein each data packet is sent once and wherein for a sequence of packets, usually for the next 8 packets, a certain one of the antennas is selected according to previous channel quality measurements as a function of frequency. For each packet of the sequence one of the antennas is selected depending on the respective frequency at which the packet is to be transmitted, wherein the frequency is determined by a frequency hopping sequence.

U.S. Patent Application Publication 2006/0148433 A1 relates to a wireless link between a mobile phone and a base station of the mobile network, wherein two receivers are used in parallel for achieving diversity if the coverage is poor.

Canadian Patent 2 286 522 C relates to a diversity radio reception method, wherein two data packets received in parallel by two receivers are compared and, if they differ from each other, the more reliable one is selected for further processing.

In the publication "Effect of Antenna Placement and Diversity on Vehicular Network Communications" by S. Kaul, K. Ramachandran, P. Shankar, S. Oh, M. Gruteser, I. Seskar, T. Nadeem, $4^{th}$ Annual IEEE Communications Society Conference on Sensor, Mesh and Ad Hoc Communications and Networks, 2007, SECON '07, pp. 112-121, a packet level diversity approach is described, wherein in a vehicle-to-vehicle link using roof- and in-vehicle-mounted omni-directional antennas and IEEE 802.11a radios operating in the 5 GHz band a packet level selection diversity scheme using multiple antennas and radios is utilized to improve performance not only in a fading channel but also in line-of-sight conditions. A similar approach is used in "Packet-Level Diversity—From Theory to Practice: An 802.11-based Experimental Investigation" by E. Vergetis et al., MobiCom '06 (see also http://repository.upenn.edu/es-e_papers/194), wherein a packet level diversity scheme is applied to a wireless data link between a laptop computer and an access point.

A presentation by S. Shellhammer "SCORT—An Alternative to the Bluetooth SCO Link for Voice Operation in an Interference Environment" document IEEE 802.15-01/145r1, March 2001, and the IEEE P802.15 Working Group for Wireless Personal Area Networks, relates to a proposed alternative for the Bluetooth SCO link for operation in an interference environment, wherein it is proposed to use, in a bi-directional point-to-point link (i.e. full duplex link) for voice transmission, repeated transmission of the same audio packet without involving a receipt acknowledgement by the receiving device.

U.S. Patent Application Publication 2007/0009124 A1 and corresponding U.S. Pat. No. 7,778,432 B2 relate to a wireless network for communication of binaural hearing aids with other devices, such as a mobile phone, using slow frequency hopping, wherein each data packet is transmitted in a separate slot of a TDMA frame, with each slot being associated to a different transmission frequency, wherein the hopping sequence is calculated using the ID of the master device, the slot number and the frame number. A link management package is sent from the master device to the slave devices in the first slot of each frame. The system may be operated in a broadcast mode. Each receiver is turned on only during the transmission during time slots associated to the respective receiver. The system has two acquisition modes for synchronization, with two different handshake protocols. Eight LMP messages are transmitted in every frame during initial acquisition, and one LMP message is transmitted in every frame once a network is established. Handshake, i.e. bi-directional message exchange, is needed both for initial acquisition and acquisition into the established network. During acquisition, only a reduced number of acquisition channels is used, with the frequency hopping scheme being applied to these acquisition channels. The system operates in the 2.4 GHz ISM band. A similar system is known from U.S. Patent Application Publication 2009/0245551 A1 and corresponding U.S. Pat. No. 8,229,146 B2.

U.S. Pat. No. 7,532,610 B2 relates to an adaptive frequency hopping scheme, wherein bad frequencies are empirically excluded from the frequency range used by the frequency hopping algorithm.

International Patent Application Publication WO 2008/135975 A2 relates to a communication network, wherein the receiver wakes up for listening to the preamble of a data packet and goes to sleep again, if no valid preamble is received.

U.S. Patent Application Publication 2006/0067550 A1 relates to a hearing aid system comprising at least three hearing aids between which a wireless communication network is established using the Bluetooth standard, wherein one of the hearing aids is used for receiving signals from another one of the hearing aids, amplifying the signals and forwarding it to the third hearing aid.

U.S. Patent Application Publication US 2007/0086601 A1 relates to a system comprising a transmission unit with a microphone for transmitting a speaker's voice to a plurality of hearing aids via a wireless digital link, which may be unidirectional or bi-directional and which may be used for transmitting both audio data and control data to the hearing aids.

U.S. Pat. No. 7,529,565 B2 relates to a hearing aid comprising a transceiver for communication with an external device, wherein a wireless communication protocol including a transmission protocol, link protocol, extended protocol, data protocol and audio protocol is used. The transmission protocol is adapted to control transceiver operations to provide half duplex communications over a single channel, and the link protocol is adapted to implement a packet transmission process to account for frame collisions on the channel.

U.S. Pat. No. 7,606,291 B2 relates to a two-way push-to-talk radio device using frequency hopping.

European Patent Application EP 1 560 383 A2 relates to a Bluetooth system, wherein the slave device, in a park mode or in a sniff mode, periodically wakes up to listen to transmission from the master and to re-synchronize its clock offset.

SUMMARY OF THE INVENTION

It is an object of the invention to provide for a sound transmission system employing a digital audio link which has relatively low power requirement and which is particularly well-suited for a plurality of receiver units. It is also an object of the invention to provide for a corresponding sound transmission method.

According to the invention, these objects are achieved by a sound transmission system and a sound transmission method as described herein.

The invention is beneficial in that, by using a link protocol wherein the same audio packet is to be transmitted at least twice in the same frame and wherein the frames are structured for unidirectional broadcast transmission of audio data packets, without individually addressing the receiver units (i.e., the frames do not include a receiver address) and without expecting any acknowledgement messages from the receivers, power consumption at the receiver side is kept low and a large number of receiver units can be used in the same network with the transmission unit.

Preferably, the same audio packet is transmitted at least twice in subsequent slots. Preferably, the receiver units use the first verified, i.e., correctly received, copy/version of each data packet as the signal to be supplied to the stimulation means, while not using the audio data of the other copies of the data packet. Usually, in the first slot of each frame, a beacon packet is to be transmitted which contains information for hopping frequency synchronization.

In order to further reduce power consumption, each receiver sleeps at least during times when no data packets are to be expected and wakes up a given guard time before expected arrival of an audio packet different to the previous audio packet. If no start frame delimiter has been received or if the previous audio packet could not be verified, the receiver wakes up a given guard time period before expected arrival of the repetition of the previous audio packet. If a start frame delimiter has been received, the receiver goes to sleep again after a given timeout period after the expected end of transmission of the audio packet; if no start frame delimiter has been received, the receiver goes to sleep again after a given timeout period after the expected end of transmission of the start frame delimiter of the audio packet; thereby further power consumption reduction can be achieved in case of missing packets. Preferably, the start frame delimiter is a 5 bytes code build from the 4 byte unique ID of the network master. This 5 byte code is called the network address, being unique for each network.

In order to achieve further power consumption reduction, each receiver may wake up a given guard time period before expected arrival of the beacon packet of only certain ones of the frames, while sleeping during expected transmission of the beacon packet of the other frames. In particular, the receiver may make up only for beacon packets of frames having a sequence number which fulfills a given condition with regard to the address of the respective receiver unit, so that the transmission unit may send a message to that specific receiver unit by including the message into the beacon packet of a frame having an appropriate sequence number. In addition, each receiver may wake up for the beacon packet of frames having a sequence number fulfilling a certain global condition (for example, every tenth frame), in order to have all receivers periodically listen to the same beacon packet.

These and further objects, features and advantages of the present invention will become apparent from the following detailed description when taken in connection with the accompanying drawings which, for purposes of illustration only, show several embodiments in accordance with the present invention

DETAILED DESCRIPTION OF THE INVENTION

The present invention relates to a system for providing hearing assistance to at least one user, wherein audio signals are transmitted, by using a transmission unit comprising a digital transmitter, from an audio signal source via a wireless digital audio link to at least one receiver unit, from where the audio signals are supplied to means for stimulating the hearing of the user, typically a loudspeaker.

Figure 1:
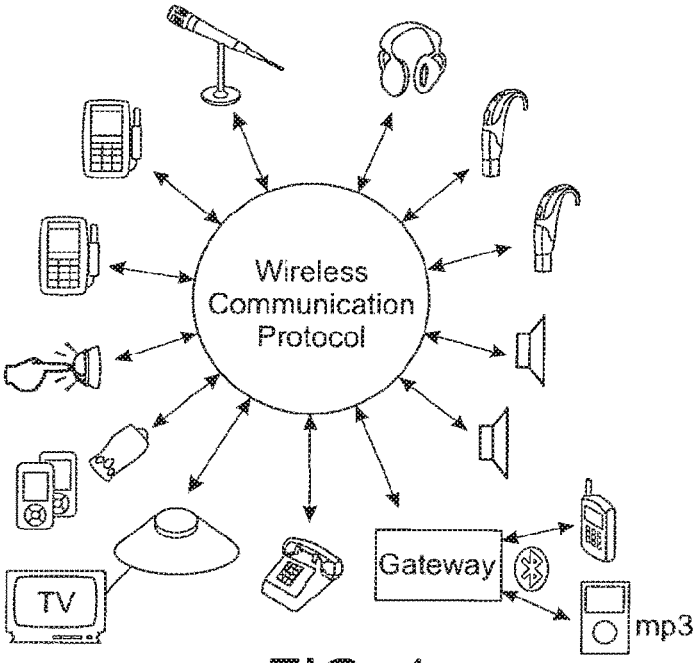
FIG. 1 is a schematic view of audio components which can be used with a system according to the invention.

As shown in FIG. 1, the device used on the transmission side may be, for example, a wireless microphone used by a speaker in a room for an audience; an audio transmitter having an integrated or a cable-connected microphone which are used by teachers in a classroom for hearing-impaired pupils/students; an acoustic alarm system, like a door bell, a fire alarm or a baby monitor; an audio or video player; a television device; a telephone device; a gateway to audio sources like a mobile phone, music player; etc. The transmission devices include body-worn devices as well as fixed devices. The devices on the receiver side include headphones, all kinds of hearing aids, ear pieces, such as for prompting devices in studio applications or for covert communication systems, and loudspeaker systems. The receiver devices may be for hearing-impaired persons or for normal-hearing persons. Also on the receiver side, a gateway could be used which relays audio signal received via a digital link to another device comprising the stimulation means.

The system may include a plurality of devices on the transmission side and a plurality of devices on the receiver side, for implementing a network architecture, usually in a master-slave topology.

The transmission unit typically comprises or is connected to a microphone for capturing audio signals, which is typically worn by a user, with the voice of the user being transmitted via the wireless audio link to the receiver unit.

The receiver unit typically is connected to a hearing aid via an audio shoe or is integrated within a hearing aid.

Usually, in addition to the audio signals, control data is transmitted bi-directionally between the transmission unit and the receiver unit. Such control data may include, for example, volume control or a query regarding the status of the receiver unit or the device connected to the receiver unit (for example, battery state and parameter settings).

Figure 2:
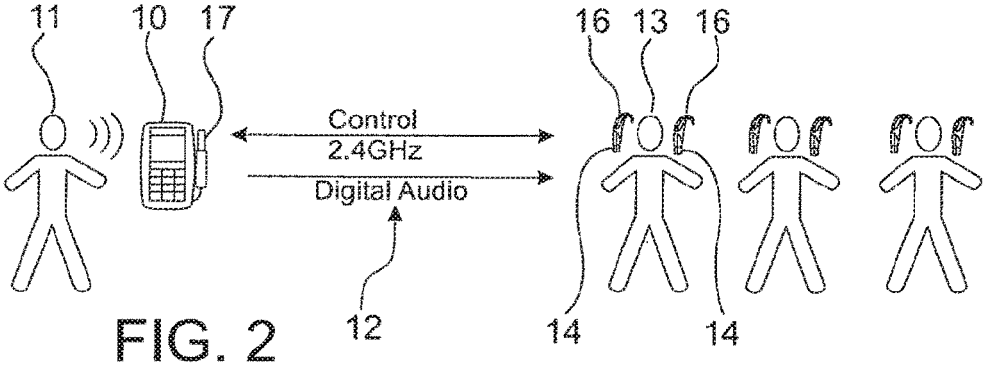
FIG. 2 is a schematic view of a use of a first example of a system according to the invention.

In FIG. 2, a typical use case is shown schematically, wherein a body-worn transmission unit 10 comprising a microphone 17 is used by a teacher 11 in a classroom for transmitting audio signals corresponding to the teacher's voice via a digital link 12 to a plurality of receiver units 14, which are integrated within or connected to hearing aids 16 worn by hearing-impaired pupils/students 13. The digital link 12 is also used to exchange control data between the transmission unit 10 and the receiver units 14. Typically, the transmission unit 10 is used in a broadcast mode, i.e., the same signals are sent to all receiver units 14.

Figure 3:
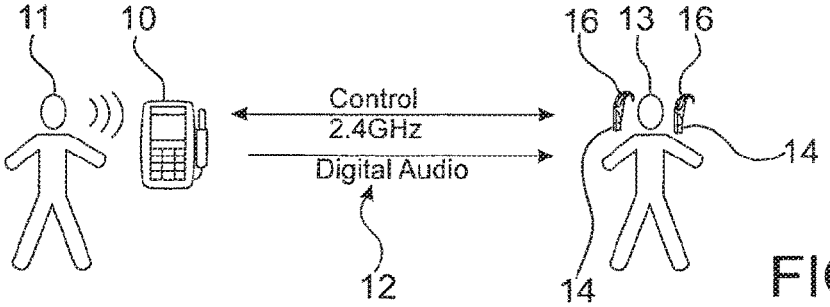
FIG. 3 is a schematic view of a use of a second example of a system according to the invention.

Another typical use case is shown in FIG. 3, wherein a transmission device 10 having an integrated microphone is used for capturing the voice of a person 11 speaking to a hearing-impaired person 13 wearing receiver units 14 connected to or integrated within a hearing aid 16. The captured audio signals are transmitted from device 10 via the digital link 12 to the receiver units 14.

Figure 4:
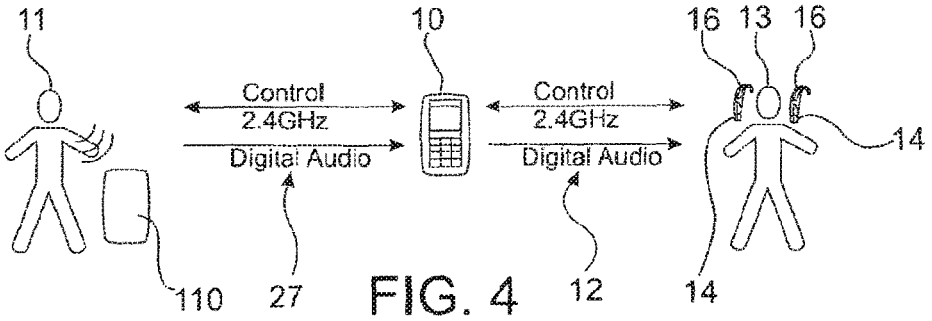
FIG. 4 is a schematic view of a use of a third example of a system according to the invention.

A modification of the use case of FIG. 3 is shown in FIG. 4, wherein the transmission device 10 is used as a relay for relaying audio signals received from a remote transmission unit 110 to the receiver units 14 of the hearing-impaired person 13. The remote transmission unit 110 is worn by a speaker 11 and comprises a microphone for capturing the voice of the speaker 11, thereby acting as a companion microphone.

According to a variant of the embodiments shown in FIGS. 2 to 4, the receiver units 14 could be designed as a neck-worn device comprising a transmitter for transmitting the received audio signals via an inductive link to an ear-worn device, such as a hearing aid.

The transmission units 10, 110 may comprise an audio input for a connection to an audio device, such as a mobile phone, a FM radio, a music player, a telephone or a TV device, as an external audio signal source.

Figure 5:
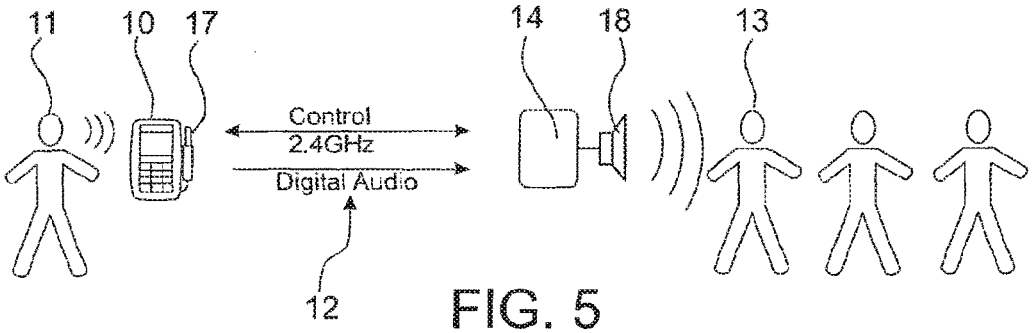
FIG. 5 is a schematic view of a use of a fourth example of a system according to the invention.

In FIG. 5, a use case is schematically shown which is similar to that shown in FIG. 2 in that a teacher 11 in a classroom uses a body-worn transmission unit 10 comprising a microphone 17 for transmitting audio signals corresponding to the teacher's voice via the digital audio link 12 to a receiver unit 14 for reproducing the teacher's voice to students 13. However, unlike in the case of FIG. 2, the receiver unit 14 is not worn by the respective student 13, but rather is connected to or integrated within an audience loudspeaker system 18 arranged in the classroom.

In each of such use cases, the transmission unit 10 usually comprises an audio signal processing unit (not shown in FIGS. 2 to 5) for processing the audio signals captured by the microphone prior to being transmitted.

Figure 6:
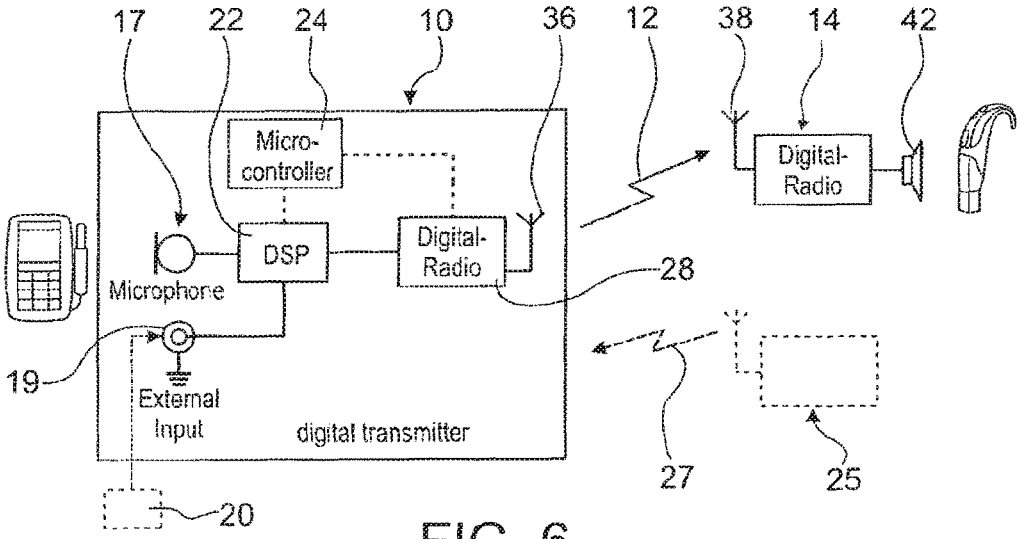
FIG. 6 is a schematic block diagram of an example of a system according to the invention.

A schematic block diagram of an example of a hearing assistance system according to the invention is shown in FIG. 6. The system comprises a transmission unit 10 and at least one digital receiver unit 14.

The transmission unit 10 comprises a microphone arrangement 17 for capturing a speaker's voice, which may be integrated within the housing of the transmission unit 10 or which may be connected to it via a cable. The transmission unit 10 also may include an audio signal input 19 which serves to connect an external audio signal source 20, such as a mobile phone, an FM radio, a music player, a telephone or a TV device, to the transmission unit 10.

The audio signals captured by the microphone arrangement 17 and/or the audio signals optionally received from the external audio signal source 20 are supplied to a digital signal processor (DSP) 22 which is controlled by a microcontroller 24 and which acts as an audio signal processing unit which applies, for example, a gain model to the captured audio signals.

In addition, the DSP 22 may serve to analyze the captured audio signals and to generate control data (control commands) according to the result of the analysis of the captured audio signals. The processed audio signals and the control data/commands are supplied to a digital transmitter 28, which is likewise controlled by the microcontroller 24.

The digital transmitter 28 transmits the modulated signals via an antenna 36 to an antenna arrangement 38 of the digital receiver unit 14, thereby establishing a digital link 12. For implementing packet level diversity on the transmitter side, the transmission unit 10 may comprise a second antenna 30 which is spaced apart from the (first) antenna 36, typically at least one or several wavelengths of the carrier frequency.

In practice, both the digital transmitter 28 and the digital receiver unit 14 are designed as transceivers, so that the digital transceiver 28 can also receive control data and commands sent from the digital receiver unit 14.

The transceiver 28 also may be used for receiving audio signals from an external audio source 25, such as a remote microphone used as a companion microphone, via a wireless digital audio link 27, with the received audio signals being supplied to the DSP 22 for retransmission by the transceiver 28. Hence, in this case, the transmission unit 10 serves to relay audio signals from the external audio source to the receiver unit 14 (see examples of FIGS. 4 and 11). Alternatively, the transmission unit 10 may include a separate receiver (not shown in the FIGS. 6 and 7) for receiving the audio signals from the external audio source; in this case the link 27 would be independent from the link 12 and thus also could be analog.

The microcontroller 24 is responsible for management of all transmitter components and may implement the wireless communication protocol, in particular for the digital link 12.

The digital receiver unit 14 comprises or is connected to a loudspeaker 42 or another means for stimulating a user's hearing. Typically, the receiver unit 14 is an ear-worn device which is integrated into or connected to a hearing aid comprising the speaker 42. The control data transmitted in parallel to the audio signals may serve to control operation of the receiver unit 14 according to the presently prevailing auditory scene as detected by the DSP 22 from the audio signal captured by the microphone arrangement 17.

Figure 7:
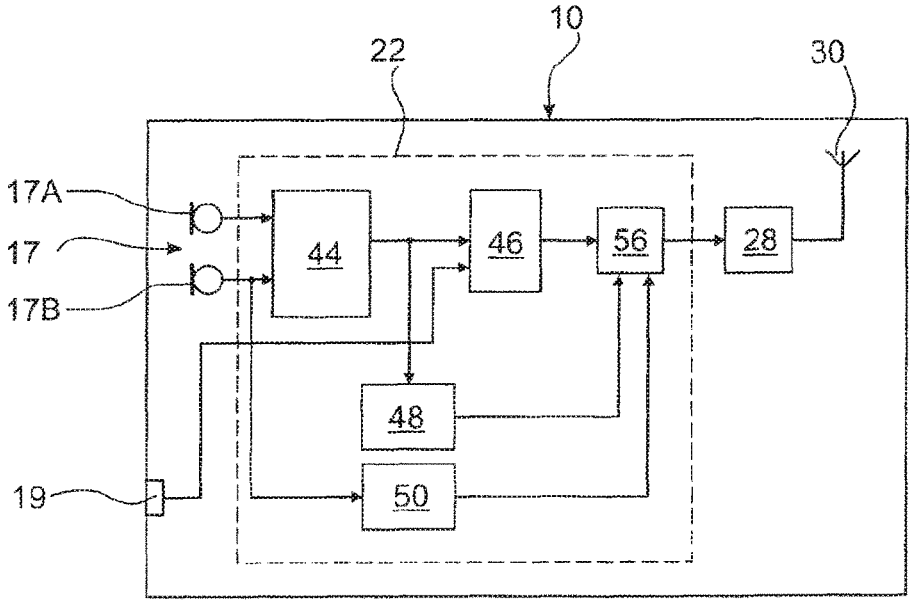
FIG. 7 is a more detailed example of the audio signal path in the transmission unit of the system of FIG. 6.

In FIG. 7, an example of the audio signal path in the transmission unit 10 is shown in more detail.

The microphone arrangement 17 of the transmission unit 10 comprises two spaced apart microphones 17A, 17B for capturing audio signals which are supplied to an acoustic beam-former unit 44 which generates an output signal supplied to a gain model unit 46. The output of the beam-former unit 44 is also supplied to a voice activity detector (VAD) unit 48 which serves to detect whether the speaker is presently speaking or not and which generates a corresponding status output signal. The output of at least one of the microphones 17A, 17B is also supplied to an ambient noise estimation unit 50 which serves to estimate the ambient noise level and which generates a corresponding output signal. The output signals of the units 48, 50 and the processed audio signals from the gain model 46 are supplied to a unit 56 which serves to generate a corresponding digital signal comprising the audio signals and the control data which is supplied to the digital transceiver 28. The external audio signals optionally received via the audio input 19 and/or the transceiver 28 may be supplied to the gain model 46.

The units 44, 46, 48, 50 and 56 may be functionally realized by the DSP 22 (see dashed line surrounding these units in FIG. 7).

As already mentioned with regard to FIG. 6, the transmission unit 10 may comprise a second antenna 30 which is spaced apart from the first antenna 36. Such a dual antenna arrangement may be used to transmit an audio data packet via the first antenna 36 and to subsequently transmit a repeated copy of the same audio data packet via the second antenna 30, as will be explained in more detail with regard to FIGS. 9 and 10.

Figure 8:
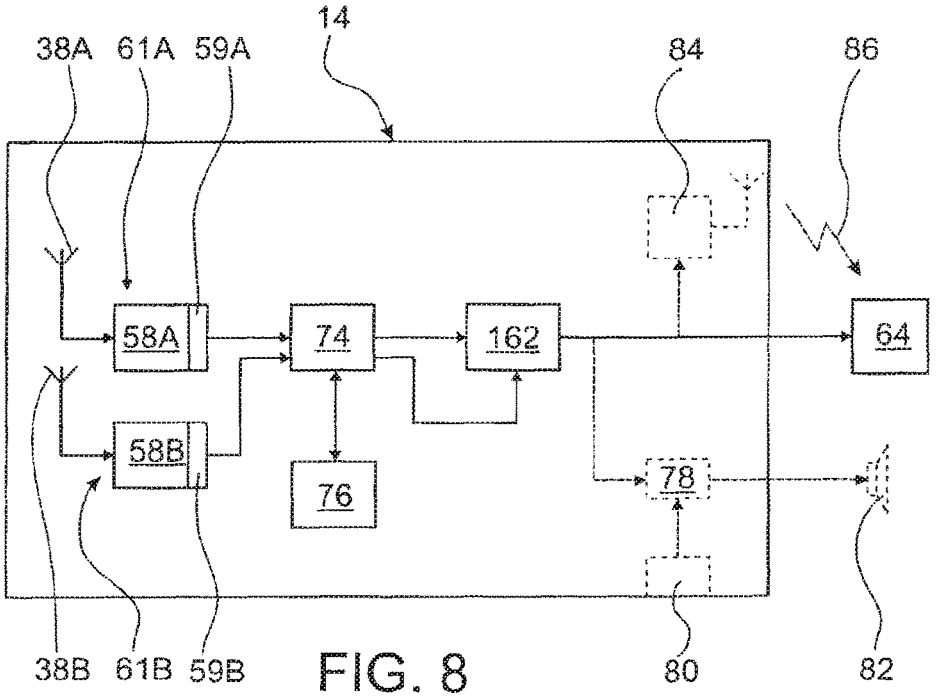
FIG. 8 is a more detailed block diagram of an example of the receiver unit of the system of FIG. 6.

A more detailed example of the digital receiver unit 14 is shown in FIG. 8, according to which the antenna arrangement 38 may comprises two separate antennas 38A, 38B, wherein the first antenna 38A is connected to a first digital receiver 61A including a demodulator 58A and a buffer 59A and the second antenna 38B is connected to a second digital receiver 61B including a demodulator 58B and a buffer 59B. The two parallel receivers may be utilized for a applying a packet level diversity scheme to the signals received via the digital link 12, as will be explained below in more detail with regard to FIGS. 16 and 17.

The antennas 38A, 38B receive the signals that are transmitted via the digital link 12 and the received signals are demodulated by the demodulators 58A, 58B in the digital radio receivers 61A, 61B. The demodulated signals are supplied via the buffers 59A, 59B to a DSP 74 acting as processing unit which separates the signals into the audio signals and the control data and which is provided for advanced processing, e.g., equalization, of the audio signals according to the information provided by the control data. The processed audio signals, after digital-to-analog conversion, are supplied to a variable gain amplifier 162 which serves to amplify the audio signals by applying a gain controlled by the control data received via the digital link 12. The amplified audio signals are supplied to a hearing aid 64. Alternatively, the variable gain amplifier may be realized in the digital domain by using a PWM modulator taking over the role of the D/A-converter and the power amplifier. The receiver unit 14 also includes a memory 76 for the DSP 74.

Rather than supplying the audio signals amplified by the variable gain amplifier 162 to the audio input of a hearing aid 64, the receiver unit 14 may include a power amplifier 78 which may be controlled by a manual volume control 80 and which supplies power amplified audio signals to a loudspeaker 82 which may be an ear-worn element integrated within or connected to the receiver unit 14. Volume control also could be achieved remotely from the transmission unit 10 by transmitting corresponding control commands to the receiver unit 14.

Alternatively, rather than being ear-worn components, the receiver unit 14 could be located somewhere in a room in order to supply audio signals to loudspeakers 82 installed in the same room, whereby a speech enhancement system for an audience can be realized (as indicated by dashed lines in FIG. 8).

Another alternative implementation of the receiver maybe a neck-worn device having a transmitter 84 for transmitting the received signals via with an magnetic induction link 86 (analog or digital) to the hearing aid 64 (as indicated by dotted lines in FIG. 8).

In general, the role of the microcontroller 24 could also be taken over by the DSP 22. Also, signal transmission could be limited to a pure audio signal, without adding control and command data.

Details of the protocol of the digital link 12 will be discussed by reference to FIGS. 9 to 13. Typical carrier frequencies for the digital link 12 are 865 MHz, 915 MHz and 2.45 GHz, wherein the latter band is preferred. Examples of the digital modulation scheme are PSK/FSK, ASK or combined amplitude and phase modulations such as QPSK, and variations thereof (for example GFSK).

The preferred codec used for encoding the audio data is ADPCM (Adaptive Differential Pulse-Code Modulation).

In addition, packet loss concealment (PLC) may be used in the receiver unit. PLC is a technique which is used to mitigate the impact of lost audio packets in a communication system, wherein typically the previously decoded samples are used to reconstruct the missing signal using techniques such as wave form extrapolation, pitch synchronous period repetition and adaptive muting.

Figure 9:
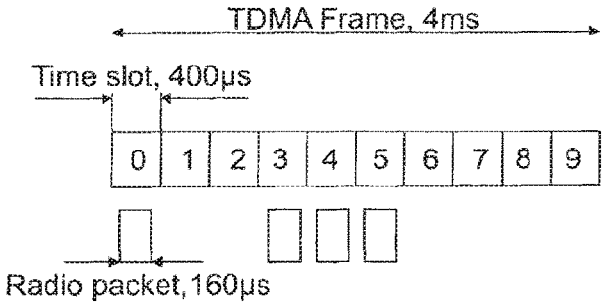
FIG. 9 is an example of the TDMA frame structure of the signals of the digital audio link used in a system according to the invention.

Preferably, data transmission occurs in the form of TDMA (Time Division Multiple Access) frames comprising a plurality of time slots (for example, 10), wherein one data packet may be transmitted in each slot. In FIG. 9, an example is shown wherein the TDMA frame has a length of 4 ms and is divided into 10 time slots of 400 μs, with each data packet having a length of 160 μs.

Figure 14:
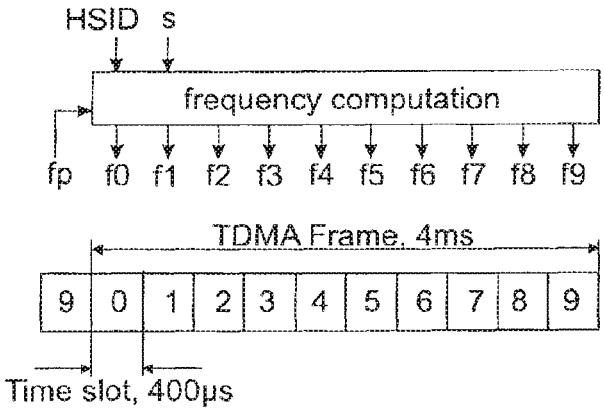
FIG. 14 is an illustration of an example of a frequency-hopping scheme used in a system according to the invention.

As will be explained by reference to FIGS. 14 and 15 below, preferably a slow frequency hopping scheme is used, wherein each slot is transmitted at a different frequency according to a frequency hopping sequence calculated by a given algorithm in the same manner by the transmitter unit 10 and the receiver units 14, wherein the frequency sequence is a pseudo-random sequence depending on the number of the present TDMA frame (sequence number), a constant odd number defining the hopping sequence (hopping sequence ID) and the frequency of the last slot of the previous frame.

The first slot of each TDMA frame (slot 0 in FIG. 9) is allocated to the periodic transmission of a beacon packet which contains the sequence number numbering the TDMA frame and other data necessary for synchronizing the network, such as information relevant for the audio stream, such as description of the encoding format, description of the audio content, gain parameter, surrounding noise level, etc., information relevant for multi-talker network operation, and optionally control data for all or a specific one of the receiver units.

Figure 10:
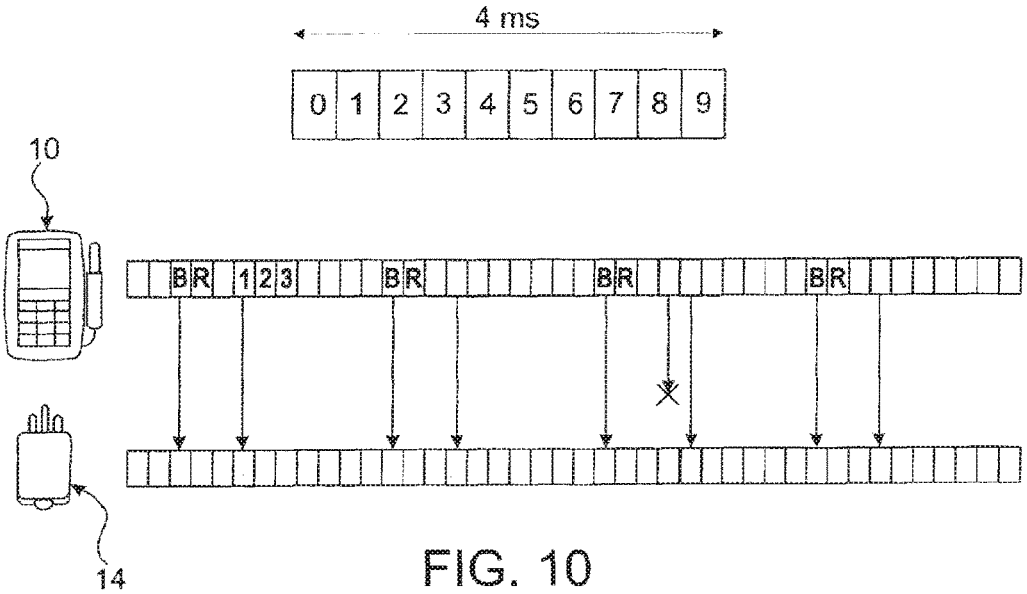
FIG. 10 is an illustration of an example of the protocol of the digital audio link used in a system according to the invention in the connected state.

The second slot (slot 1 in FIG. 9) may be allocated to the reception of response data from slave devices (usually the receiver units) of the network, whereby the slave devices can respond to requests from the master device through the beacon packet. At least some of the other slots are allocated to the transmission of audio data packets, wherein each audio data packet is repeated at least once, typically in subsequent slots. In the example shown in FIGS. 9 and 10, slots 3, 4 and 5 are used for three-fold transmission of a single audio data packet. The master device does not expect any acknowledgement from the slaves devices (receiver units), i.e., repetition of the audio data packets is performed in any case, irrespective of whether the receiver unit has correctly received the first audio data packet (which, in the example of FIGS. 9 and 10, is transmitted in slot 3) or not. Also, the receiver units are not individually addressed by sending a device ID, i.e., the same signals are sent to all receiver units (broadcast mode).

Rather than allocating separate slots to the beacon packet and the response of the slaves, the beacon packet and the response data may be multiplexed on the same slot, for example, slot 0.

The audio data maybe compressed in the transmission unit 10 prior to being transmitted.

If the transmission unit 10 comprises two antennas 30, 36, packet level diversity with regard to the audio data packets may be realized on the transmitter side by transmitting each one of the copies of the same audio data packet alternately via a different one of the antennas 30, 36. For example, the first copy of the audio data packet (which, in the example of FIGS. 9 and 10, is transmitted in slot #3, may be transmitted via the antenna 36, whereas the second copy (in slot #4) may be transmitted via the antenna 30, while the third copy (in slot #5) may be transmitted again via the antenna 36. If for example, at the position of the antenna 36 multi-path fading occurs with regard to the antenna of the receiver unit 14, it is unlikely that multi-path fading likewise occurs at the position of the antenna 30, so at least one copy will be transmitted/received without fading.

Figure 11:
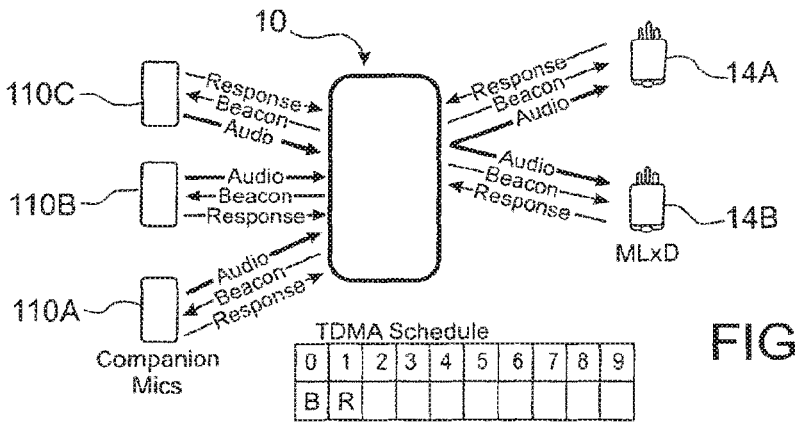
FIG. 11 is an illustration of an example of the protocol of the digital audio link used in an example of an assistive listening application with several companion microphones of a system according to the invention.

In FIG. 11, an example of a more complex slot allocation scheme is shown, wherein, as in the example of FIGS. 9 and 10, slot 0 is allocated to the beacon packet from the master device and slot 1 is allocated to response data packets. However, in the example of FIG. 11, each audio data packet is repeated only once and a transmission unit 10 is used as a relay/gateway between three remote transmission units 110A, 110B and 110C acting as companion microphones and two receiver units 14A, 14B. Slots 2 and 3, slots 4 and 5 and slots 6 and 7 are used for transmission of audio data from the first external transmission unit 110A, the second external transmission unit 110B and the third external transmission unit 110C, respectively, towards the relay/gateway transmission unit 10, and slots 8 and 9 are allocated to transmission of audio data packets from the relay/gateway transmission unit 10 to the receiver units 14A, 14B. The beacon packet in slot 0 is sent from the unit 10 acting as the master to all slaves, i.e. the units 110A, 110B, 110C, 14A and 14B. The beacon packet and the response packet can also be time-multiplexed on the same slot 0 (e.g., even numbered TDMA frames for beacon packets, odd numbered TDMA frames for response packets).

Usually, in a synchronized state, each slave listens only to specific beacon packets (the beacon packets are needed primarily for synchronization), namely those beacon packets for which the sequence number and the ID address of the respective slave device fulfills a certain condition, whereby power can be saved. When the master device wishes to send a message to a specific one of the slave devices, the message is put into the beacon packet of a frame having a sequence number for which the beacon listening condition is fulfilled for the respective slave device. This is illustrated in FIG. 12, wherein the first receiver unit 14A listens only to the beacon packets sent by the transmission unit 10 in the frames number 1, 5, etc., the second receiver unit 14B listens only to the beacon packets sent by the transmission unit 10 in the frames number 2, 6, etc., and the third receiver unit 14C listens only to the beacon packet sent by the transmission unit 10 in the frames number 3, 7, etc.

Figure 12:
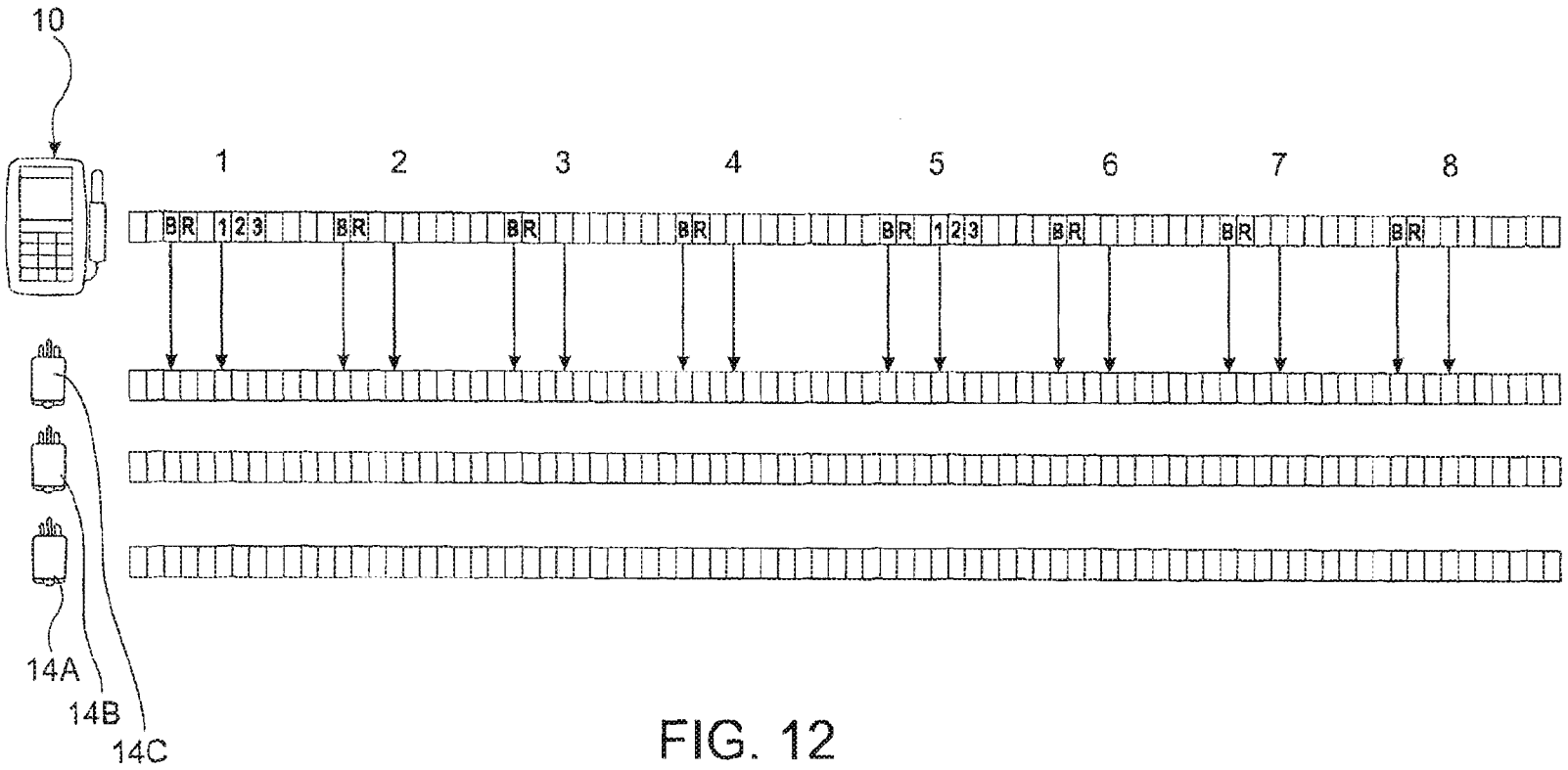
FIG. 12 is an illustration of an example of the protocol of the digital audio link used in an example of an assistive listening application with several receivers of a system according to the invention.

Periodically, all slave devices listen at the same time to the beacon packet, for example, to every tenth beacon packet (not shown in FIG. 12).

Each audio data packet comprises a start frame delimiter (SFD), audio data and a frame check sequence, such as CRC (Cyclic Redundancy Check) bits. Preferably, the start frame delimiter is a 5 bytes code built from the 4 byte unique ID of the network master. This 5 byte code is called the network address, being unique for each network.

In order to save power, the receivers 61A, 61B in the receiver unit 14 are operated in a duty cycling mode, wherein each receiver wakes up shortly before the expected arrival of an audio packet. If the receiver is able to verify (by using the CRC at the end of the data packet), the receiver goes to sleep until shortly before the expected arrival of a new audio data packet (the receiver sleeps during the repetitions of the same audio data packet), which, in the example of FIGS. 9 and 10, would be the first audio data packet in the next frame. If the receiver determines, by using the CRC, that the audio data packet has not been correctly received, the receiver switches to the next frequency in the hopping sequence and waits for the repetition of the same audio data packet (in the example of FIGS. 9 and 10, the receiver then would listen to slot 4 as shown in FIG. 10, wherein in the third frame transmission of the packet in slot 3 fails).

In order to further reduce power consumption of the receiver, the receiver goes to sleep shortly after the expected end of the SFD, if the receiver determines, from the missing SFD, that the packet is missing or has been lost. The receiver then will wake up again shortly before the expected arrival of the next audio data packet (i.e., the copy/repetition of the missing packet).

Figure 13:
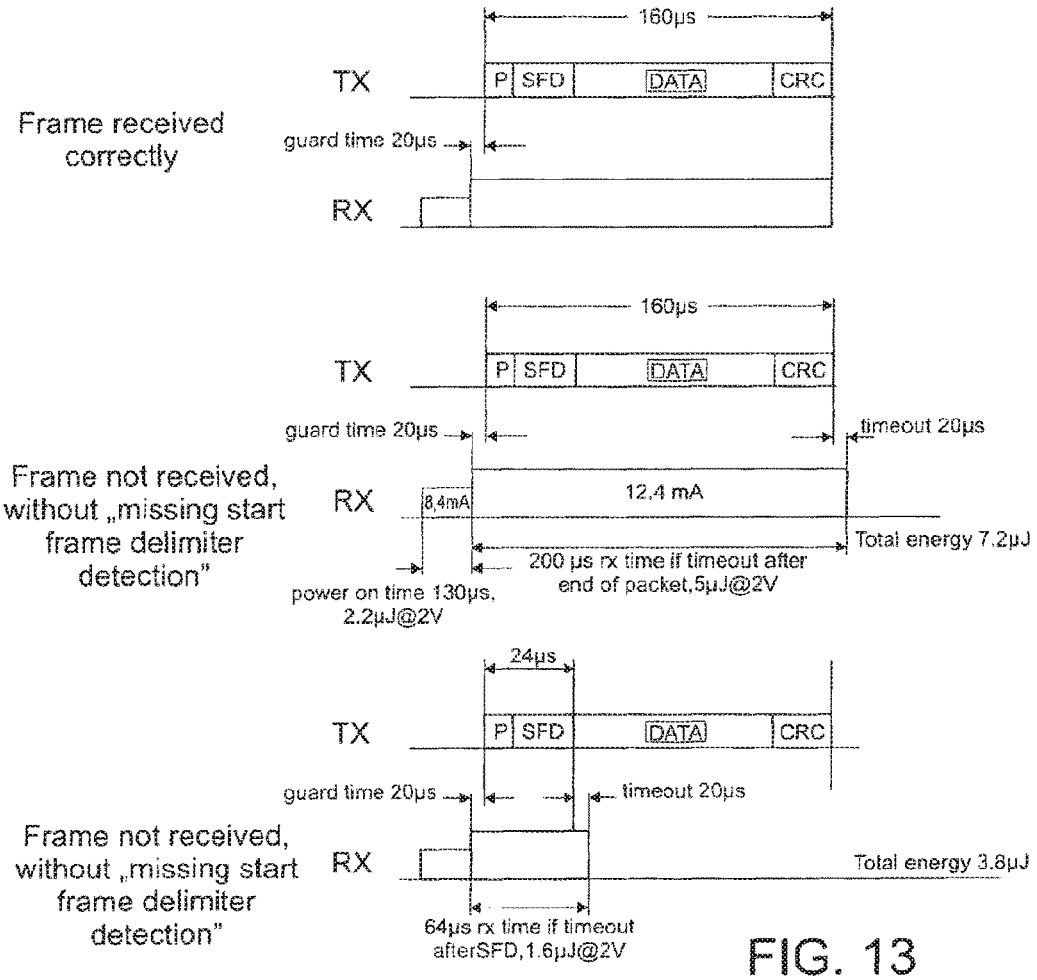
FIG. 13 is an illustration of an example of how a receiver unit in a system according to the invention listens to the signals transmitted via the digital audio link.

An example of duty cycling operation of the receiver is shown in FIG. 13, wherein the duration of each data packet is 160 μs and wherein the guard time (i.e., the time period by which the receiver wakes up earlier than the expected arrival time of the audio packet) is 20 μs and the timeout period (i.e., the time period for which the receiver waits after the expected end of transmission of the SFD and CRC, respectively) likewise is 20 μs. It can be seen from FIG. 13 that, by sending the receiver to sleep after timing out of SFD transmission (when no SFD has been received), the power consumption can be reduced to about half of the value when the receiver is sent to sleep after timeout of CRC transmission.

As already mentioned above, a pseudo-random frequency hopping scheme is used for data transmission. As illustrated in FIG. 14, for calculating the frequency-hopping sequence, an algorithm is used which has, as input parameters, the frequency $f_p$ used for the last slot of the previous frame, the hopping sequence ID (HSID) and the sequence number s of the present frame. The algorithm uses a linear congruent generator (LCG) which outputs the frequency for each slot of the frame based on these three input parameters. An example of the computation of $f_i, i\epsilon\{0;9\}$, based on the three parameters HSID, s and $f_p$ are given below:

Initialisation of Constants $$c=HSID$$

$$m=2^{16}$$

$$r=s$$

Computation of $f_0$ Based on $f_p$ $$r=mod(17\cdot r+c,m)$$

$$\hat{r}=(19\cdot r)/2^{16}$$

$$f_0=mod(f_p+11+\hat{r},40)$$

Computation of $f_1, f_2, \ldots, f_9$ for Each $f_i$, $i\epsilon\{1:9\}$ $$r=mod(17\cdot r+c,m)$$

$$\hat{r}=(19\cdot r)/2^{16}$$

$$f_i=mod(f_{i-1}+11+\hat{r},40)$$

The information necessary to compute the frequency-hopping sequence for the present frame is transmitted in the beacon packet in the first slot of the frame from the master device to the slave devices. The hopping sequence ID is not included in the beacon packet, but rather is transmitted in a pairing phase to the slave devices and is stored in each slave device. Once synchronized to the master device, the slave devices increment the sequence number automatically to calculate the frequency at which the beacon packet of the next frame is to be received.

The Hopping Sequence ID is chosen as an odd number between 1 and 65535 . . . . This number is chosen randomly by the network master (relay unit 15) and transmitted to the network slaves (transmission units 10 and receiver units 14) during pairing. This odd number is used as the additive term of the LCG. By selecting the hopping sequence ID randomly, it is provided that the hopping sequence is likely to be unique to the present network, so that there is only low cross-correlation with the hopping sequence of another network which may exist, for example, in the same building.

In the unlikely event that two networks select the same hopping sequence ID and disturb each other, a new pairing process in one of the networks is likely to result in a different hopping sequence ID. The use of the frequency of the last slot of the previous frame in the hopping sequence algorithm ensures that there is always a minimum distance between two subsequent slots, namely also between the last slot of the previous frame and the first slot of the present frame.

Preferably, the frequency-hopping scheme is an adaptive frequency-hopping scheme, wherein packet error rate measurements are made for the used frequencies and wherein the master device may decide, based on such measurements, that a sub-set of the available frequencies should be declared as "bad frequencies" and should not be used any longer. If then, the frequency computation algorithm selects one of the bad frequencies, a frequency is pseudo-randomly selected instead, from a set of frequencies composed of all "good frequencies" at the exception of the good frequency used in the preceding slot. Removing the frequency used in the preceding slot from the set of potential replacement frequencies presents the advantage of avoiding the possibility of using the same frequency twice in consecutive slots.

Figure 15:
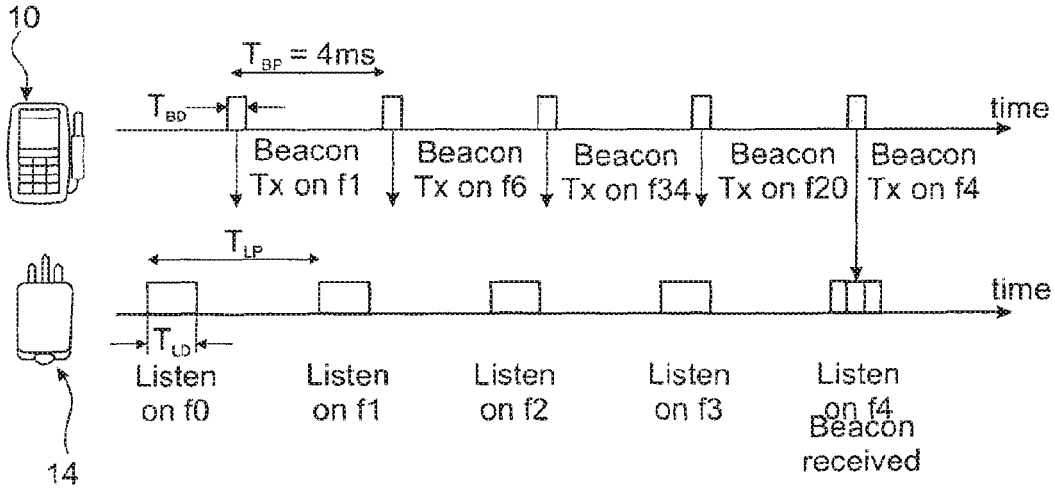
FIG. 15 is an illustration of the communication in a system according to the invention during synchronization of the digital link.

FIG. 15 illustrates how synchronization between the master device (for example, the transmission unit 10) and the slave devices (for example, one of the receiver units 14) may be achieved.

The synchronization is passive in the sense that there is no feedback from the slave device to the master device during synchronization. Usually, the master device, e.g., the transmission unit 10, does not distinguish whether a certain one of the slaves, e.g., the receiver units 14, is in still a synchronization mode or already in a synchronized mode, so that the transmission operation of the master is always the same, i.e., the same algorithm for determining the hopping sequences is used and the same protocol is used, e.g., beacon packet in the first slot, audio data packets in some of the other slots (as long as audio signals are generated in/supplied to the transmission unit; the audio data packets are not shown in FIG. 15).

Thus, the master device transmits a beacon packet in regular intervals, namely in the first slot of each TDMA frame (according to the example, a beacon packet is sent every 4 ms). The frequency at which the respective beacon packet is sent is calculated according to the same pseudo-random hopping-sequence algorithm which is used for transmitting audio packets in the synchronized state. The hopping sequence is long in the sense that it is much longer/larger than the number of frequency channels (for example, a sequence of the length 100 is likely to show a bad correlation with another sequence of the length 100, depending on the time shift). The slave device listens periodically for the first beacon packet for synchronization, i.e., it is operated in a duty cycling mode. The listening time period is longer than the duration of the beacon packet. Each listening period is done at a different frequency; for example, the first listening period may at the lowest frequency of the available band (i.e., the receiver listens in the lowest one of the frequency channels), and then the listening frequency is increased for each subsequent listening period (thereby going systematically through all frequency channels). After each listening period, the receiver goes back to sleep. The periodicity of the listening periods is chosen close to the beacon packet transmission periodicity (i.e., the frame length), but it is not exactly equal, in order to have a drift between the beacon packet transmission phase and the listening phase. Due to this drift, the listening phase is periodically in phase with the transmission of the beacon packet for a certain duration. When the beacon packet is transmitted at the same frequency as the one used presently for listening, synchronization is achieved and the receiver switches into the synchronized mode/state, wherein it can calculate the hopping sequence presently used by the transmission unit from the information included in the received beacon packet (i.e., the frame sequence number) and the hopping sequence ID stored in the receiver unit from the pairing phase. A more detailed explanation of this synchronization method is given below.

When a receiver is in the synchronization phase, it listens periodically with period $T_{ListenPeriod}$ for a duration $T_{ListenDuration}$ at a given frequency and then goes back to sleep. The frequency is changed for each listening phase starting with frequency number 0, and incrementing up to e.g., frequency 39. The beacon is transmitted on any of the 40 frequencies, following the pseudo-random frequency selection.

The period $T_{ListenPeriod}$ is chosen to be close to the beacon transmission period $T_{BeaconPeriod}$ but not to be exactly equal. The difference $\Delta T=|T_{ListenPeriod}-T_{BeaconPeriod}$ causes a drift between the beacon packet transmission phase and the listening phase. Due to this drift, the listening phase is periodically in phase with the transmission of the beacon packet for a certain duration. If the beacon packet is transmitted at the same frequency as the one used for listening, synchronization is achieved. This mechanism is illustrated in FIG. 15.

The values of parameters $T_{ListenPeriod}$, $T_{ListenDuration}$ are to be chosen based on the beacon packet period $T_{BeaconPeriod}$ and on the beacon packet duration $T_{BeaconDuration}$, as a trade-off between the synchronization delay and the synchronization power consumption.

With $T_{ListenPeriod}=T_{BeaconPeriod}(1+\theta)$, and $\Delta T=\theta T_{BeaconPeriod}$ is the shift in phase of the listening activity for every transmission of the beacon packet.

$T_{ListenDuration}$ must be larger than $T_{BeaconDuration}$ such that it is possible to receive a beacon packet. An additional margin $\Delta T$ is required such that the listen window is open for the duration of the beacon packet transmission, given the fact that the listen window is drifting compared to the transmission window. A larger margin than $\Delta T$ gives the opportunity for the reception of more than one beacon packet in a given transmission window.

The time interval between two in-phase periods will be $$\begin{aligned} T_{InPhasePeriod} &= \frac{T_{BeaconPeriod}\,T_{ListenPeriod}}{\Delta T} \\ &= \frac{T_{BeaconPeriod}\,T_{ListenPeriod}}{\theta T_{BeaconPeriod}} \\ &= \frac{T_{ListenPeriod}}{\theta} \\ &= T_{BeaconPeriod}\frac{1+\theta}{\theta} \end{aligned}$$

When the transmission and listening intervals are in phase, there will be enough time for a limited number of transmission trials, until the windows are out of phase again. The number of possible trials is given by $$N_{TrialInPhase} = \left\lfloor \frac{T_{ListenDuration} - T_{BeaconDuration}}{\Delta T} \right\rfloor,$$

where $\lfloor\ \rfloor$ means rounded to the nearest integer in a direction towards zero.

The average synchronization delay can then be computed with $$\overline{T}_{Synchronization} = \frac{T_{InPhasePeriod}/N_{TrialsInPhase}}{1/N_{Channels}},$$

when $N_{Channels}=40$, $\theta=0.01$, $T_{BeaconPeriod}=4$ ms, $T_{ListenDuration}=600$ μs, $\overline{T}_{Synchronization}=1.6$ s and the duty cycle will be, in this case, $$\eta = \frac{T_{ListenDuration}}{T_{ListenPeriod}} = \frac{600}{4000} = 15\%.$$

A further refinement can be obtained if a transmission unit has two radios, i.e., transmitters/transceivers. In such case, the two radios may be used to transmit the beacon messages in an inter-leaved manner, or in parallel and at different frequencies. This method would reduce the synchronization time required at the receiver side.

Figure 16:
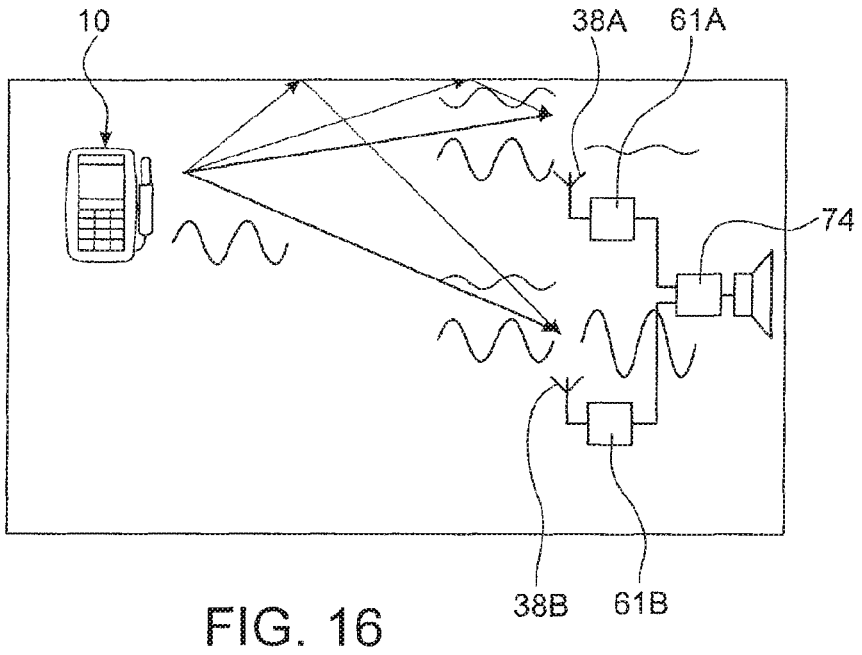
FIG. 16 is an illustration of antenna diversity in a system according to the invention.

As illustrated in FIG. 16, by using two spaced-apart antennas 38A, 38B multi-path fading resulting from destructive interference between several copies of the same signal travelling due to multiple reflections along different signal paths with different lengths (for example, direct signal and signal reflected once), can be mitigated, since the interference conditions are different at different positions, i.e., if destructive interference occurs at the position of one of the antennas, it is likely that no destructive interference occurs at the position of the other antenna. In other words, if the two antennas are sufficiently spaced apart, the fading events are uncorrelated on both antennas.

The present invention may utilize this effect by applying a packet level diversity scheme in the receiver unit. When a data packet has been received by the receiver 58A, it will be verified by using the CRC and it will be buffered in the buffer 59A. In addition, an interrupt request is sent from the receiver 59A to the processing unit 74, in order to indicate that a packet has been received. The other receiver 58B acts in parallel accordingly: when it receives a data packet, it verifies the data packet and buffers it in the buffer 59B and sends an interrupt request to the processing unit 74.

When the processing unit 74 receives such an interrupt request, it reads the data packet from one of the two buffers 59A, 59B (usually, there is a default setting as to from which one of the buffers the processing unit 74 will try to read the data packet first) and flushes the other one of the buffers 59A, 59B, if the data packet was obtained correctly (rather than using interrupt requests, the respective buffer 59A, 59B could be checked at the end of the last reception slot; i.e., the receivers could operated via polling rather than via interrupts). However, if it is not possible to read the data packet from the default one of the buffers (usually because the respective antenna 38A, 38B suffered from severe multipath fading at the reception time), the processing unit 74 tries to read the data packet from the other one of the buffers and, if it is successful in reading the data packet, it flushes the buffer of the other.

Figure 17:
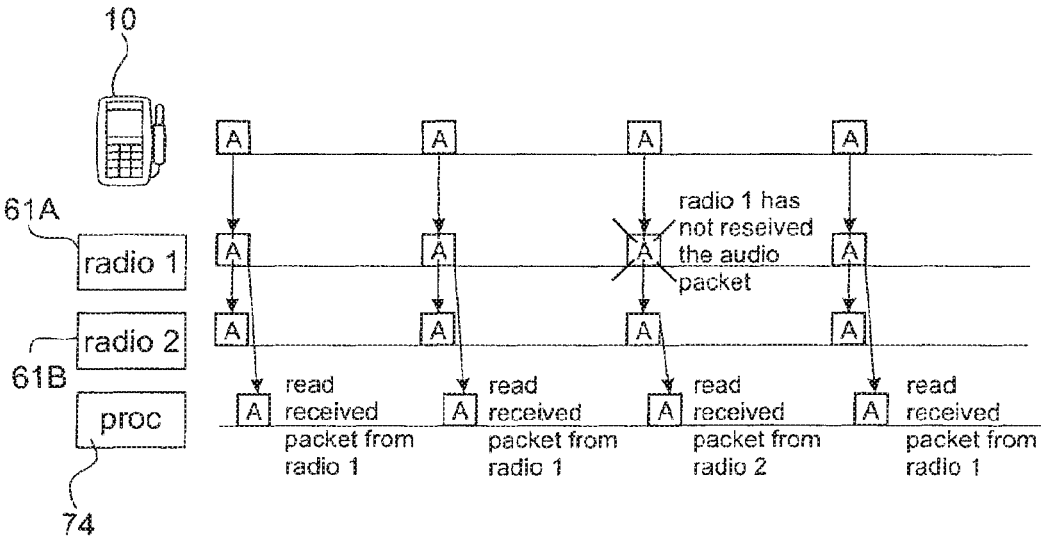
FIG. 17 is a further illustration of an example of a packet level diversity scheme used in a system according to the invention.

An example of this method is illustrated in FIG. 17, wherein it is assumed that the third transmission of the data packet "A" from the transmission unit 10 fails at the antenna 38A allocated to the receiver 58A so that, in this case, the processing unit 74 reads the data packet from the buffer 59B of the receiver 58B rather than from the buffer 59A of the receiver 58A (which, in the example, is the default receiver). Typically, such packet level diversity is applied not only to the audio data packets, but also to the other data packets, such as the beacon packet.

However, it is noted that such packet level diversity is not applicable to ear level receiver units since, due to the small size of ear level receiver units, there is usually not enough space for the required spatial separation of the two antennas required for the above-described packet level diversity scheme.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. A system for providing sound to at least one user, comprising:

at least one audio signal source for providing audio signals;

a transmission unit comprising a digital transmitter for applying a digital modulation scheme [in order] *configured* to transmit the audio signals as data packets from the audio signal source via a wireless digital audio link;

at least one receiver unit [for reception of] *configured to receive* audio signals from the transmission unit via the digital audio link, comprising at least one digital receiver;

means for stimulating hearing of at least one user according to audio signals supplied from the receiver unit;

wherein the transmission unit is [adapted] *configured* to transmit each data packet in a separate slot of a TDMA frame at a different frequency according to a frequency hopping sequence, wherein, in at least some of the slots, the audio signals are [to be] transmitted as audio data packets, wherein a same audio packet is [to be] transmitted at least twice in a same TDMA frame, without expecting acknowledgement messages from the at least one receiver unit, wherein the TDMA frames are structured for unidirectional broadcast transmission of the audio data packets, without individually addressing the at least one receiver unit, and wherein each audio data packet comprises a start frame delimiter, audio data and a frame check sequence, and wherein each digital receiver of the at least one receiver unit is [adapted] *configured* to verify each received data packet by using the frame check sequence and to use the audio data of the first verified version of each data packet as the signal to be supplied to the stimulation means while not using the audio data of other versions.

2. The system of claim 1, wherein the same audio packet is [to be] transmitted at least twice in subsequent slots.

3. The system of claim 1, wherein each receiver of the at least one receiver unit is adapted to sleep at least during times when no data packets are [to be] expected.

4. The system of claim 3, wherein each receiver of the at least one receiver unit is adapted to wake up a given guard time period before expected arrival of an audio packet different from the previous audio packet.

5. The system of claim 4, wherein each receiver of the at least one receiver unit is adapted to wake up at a given guard time period before expected arrival of the repetition of the previous audio packet, if a start frame delimiter has not been received or if the previous audio packet could not be verified.

6. The system of claim 5, wherein each receiver of the at least one receiver unit is adapted to go to sleep again after a given timeout period after an expected end of transmission of the audio packet, if no audio packet has been received.

7. The system of claim 6, wherein each receiver is adapted to go to sleep again after a given timeout period after an expected end of transmission of the start frame delimiter of the audio packet, if a start frame delimiter has not been received.

8. The system of claim 1, wherein, in a first slot of each frame, a beacon packet is [to be] transmitted which contains information for hopping frequency synchronization.

9. A system for providing sound [to at least one user], *the system* comprising:

[at least one] *an* audio signal source for providing audio signals;

a transmission unit comprising a digital transmitter for applying a digital modulation scheme [in order] *configured* to transmit the audio signals as data packets from the audio signal source via a wireless digital audio link;

[at least one] *a* receiver unit *configured* for reception of [audio signals] *the data packets* from the transmission unit via the digital audio link, [comprising at least one] *wherein the receiver unit includes a* digital receiver;

means for [stimulating hearing of at least one] *providing at least portions of the audio signals to a* user [according to audio signals supplied from the receiver unit;], wherein the transmission unit is [adapted to] *configured to* transmit each data packet in a separate slot of a [TDMA] *time-slotted* frame at a different frequency according to a frequency hopping sequence, wherein[,] in at least some of [the slots,] the [audio signals] *data packets* are [to be] transmitted as audio data packets, *and* wherein [a same] *each* audio *data* packet is [to be] transmitted at least twice in [a] *the* same [TDMA] *time-slotted* frame[,] without expecting acknowledgement messages from the at least one receiver[unit, wherein, in a first slot of each frame, a beacon packet to be transmitted is provided which contains data necessary for synchronizing the network, and wherein each receiver of the at least one receiver unit is adapted to wake up a given guard time period before expected arrival of the beacon packet of certain ones of the frames, while sleeping during expected transmission of the beacon packet of the other frames].

10. The system of claim 9, wherein [each receiver of the at least one] *the* receiver unit is adapted to wake up at a given guard time period before expected arrival of beacon packets of frames [having a sequence number which fulfills a given condition with regard to an address of the respective receiver unit] *having a sequence number which fulfills a given condition with regard to periodicity*.

11. The system of claim 10, wherein the [at least one] receiver unit [comprise] *is a first receiver unit and the system further comprises* a plurality of receiver units, and wherein the transmission unit is adapted to send a message to a specific one of the receiver units by including the message into the beacon packet of a frame having a sequence number for which the given condition is fulfilled with regard to an address of [the] *a* respective receiver unit.

[12. A system for providing sound to at least one user, comprising:

at least one audio signal source for providing audio signals;

a transmission unit comprising a digital transmitter for applying a digital modulation scheme in order to transmit the audio signals as data packets from the audio signal source via a wireless digital audio link;

at least one receiver unit for reception of audio signals from the transmission unit via the digital audio link, comprising at least one digital receiver;

means for stimulating hearing of at least one user according to audio signals supplied from the receiver unit;

wherein the transmission unit is adapted to transmit each data packet in a separate slot of a TDMA frame at a different frequency according to a frequency hopping sequence, wherein, in at least some of the slots, the audio signals are to be transmitted as audio data packets, wherein a same audio packet is to be transmitted at least twice in a same TDMA frame, without expecting acknowledgement messages from the at least one receiver unit, wherein, in a first slot of each frame, a beacon packet to be transmitted is provided which contains data necessary for synchronizing the network, and wherein the at least one receiver unit comprise a plurality of receiver units, and wherein each receiver unit is adapted to wake up at a given guard time period before expected arrival of the beacon packet of frames having a sequence number fulfilling a certain global condition, in order to have all receiver units periodically listen to a same beacon packet.]

[13. The system of claim 8, wherein the transmission unit is adapted to receive in a second slot of each frame a control data packet from the receiver units requested by the transmission unit.]

[14. The system of claim 8, wherein a first slot of each frame is for multiplexing a beacon packet to be sent by the transmission unit and a control data packet to be received from the at least one receiver unit as requested by the transmission unit.]

[15. A system for providing sound to at least one user, comprising:

at least one audio signal source for providing audio signals;

a transmission unit comprising a digital transmitter for applying a digital modulation scheme in order to transmit the audio signals as data packets from the audio signal source via a wireless digital audio link;

at least one receiver unit for reception of audio signals from the transmission unit via the digital audio link, comprising at least one digital receiver;

means for stimulating hearing of at least one user according to audio signals supplied from the receiver unit;

wherein the transmission unit is adapted to transmit each data packet in a separate slot of a TDMA frame at a different frequency according to a frequency hopping sequence, wherein, in at least some of the slots, the audio signals are to be transmitted as audio data packets, wherein a same audio packet is to be transmitted at least twice in a same TDMA frame, without expecting acknowledgement messages from the at least one receiver unit, wherein, in a first slot of each frame, a beacon packet to be transmitted is provided which contains data necessary for synchronizing the network, and wherein the at least one receiver unit comprise a plurality of receiver units, and wherein each beacon packet includes at least one item of information relevant for an audio stream from the group of items comprising a description of encoding format, a description of audio content, a gain parameter, surrounding noise level; information relevant for multi-talker network operation, and control data for all or a specific one of the receiver units.]

[16. The system of claim 1, wherein the transmission unit is adapted to encode the audio data using ADPCM.]

[17. The system of claim 1, wherein the audio signal source is a microphone arrangement integrated into or connected to the transmission unit for capturing a speaker's voice.]

[18. The system of claim 17, wherein the transmission unit comprises an audio signal processing unit for processing the audio signals captured by the microphone arrangement prior to being transmitted.]

[19. The system of claim 1, wherein the transmission unit is adapted to establish the digital audio link at a carrier frequency in a 2.4 GHz ISM band.]

[20. The system of claim 1, wherein the transmission unit is adapted to be connected to an external audio device from the group of external audio devices comprising a mobile phone, an FM radio, a music player, a telephone and a TV device, as the audio signal source.]

[21. The system of claim 1, wherein the transmission unit is adapted to be connected via a digital audio link to an external transmission unit comprising a microphone for capturing a speaker's voice as the audio signal source.]

[22. The system of claim 1, wherein the at least one receiver unit comprise a plurality of receiver units, and wherein at least one of the receiver units is connected to or integrated into an ear-worn device, comprising the stimulation means.]

[23. The system of claim 1, wherein the at least one receiver unit comprise a plurality of receiver units, and wherein at least one of the receiver units is a neck-worn device comprising a transmitter for transmitting audio signals via an inductive link to an ear-worn device, comprising the stimulation means.]

[24. The system of claim 1, wherein the at least one receiver unit comprise a plurality of receiver units, and wherein the at least one receiver unit is connected to or integrated within at least one audience loudspeaker serving as the stimulation means.]

[25. A system for providing sound to at least one user, comprising:

at least one audio signal source for providing audio signals;

a transmission unit comprising a digital transmitter for applying a digital modulation scheme in order to transmit the audio signals as data packets from the audio signal source via a wireless digital audio link;

at least one receiver unit for reception of audio signals from the transmission unit via the digital audio link, comprising at least one digital receiver;

means for stimulating hearing of at least one user according to audio signals supplied from the receiver unit;

wherein the transmission unit is adapted to transmit each data packet in a separate slot of a TDMA frame at a different frequency according to a frequency hopping sequence, wherein in at least some of the slots, the audio signals are to be transmitted as audio data packets, wherein a same audio packet is to be transmitted at least twice in a same TDMA frame, without expecting acknowledgement messages from the at least one receiver unit, wherein the TDMA frames are structured for unidirectional broadcast transmission of the audio data packets, without individually addressing the at least one receiver unit, and wherein the at least one receiver unit comprise a plurality of receiver units, and wherein at least one of the receiver units is a neck-worn device comprising a transmitter for transmitting audio signals via an inductive link to an ear-worn device, comprising the stimulation means, and wherein the at least one receiver unit comprise a plurality of receiver units, wherein each receiver unit comprises at least two digital receivers, each being connected to a common processing unit and an antenna and including a demodulator and a buffer, wherein each receiver is for receiving, verifying and buffering each of the audio data packets, wherein each receiver unit is adapted to send an interrupt request from at least one of the receivers to the processing unit to indicate when a packet has been received, and wherein the processing unit is adapted to read an audio data packet from a buffer of one of the receivers and, if the packet has been correctly received by that receiver, to flush the buffer of the other receivers and, if the packet has not been correctly received by that receiver, to read the audio data packet from the buffer of another one of the receivers.]

*26. A method for providing sound, the method comprising:*

*transmitting an audio signal as audio data packets from a transmission unit via a wireless digital audio link;*

*receiving, at a receiver unit, the audio data packets from the transmission unit via the digital audio link,*

*wherein the receiver unit includes a digital receiver,*

*wherein the transmission unit transmits each audio data packet twice in separate slots of a time-slotted frame at different frequencies according to a frequency hopping sequence, and*

*wherein transmissions of the twice transmitted audio data packets are executed unconditionally, irrespective of whether the receiver unit has correctly received one of the transmissions of the audio data packets.*

*27. The method of claim 26, wherein each frame comprises a start frame delimiter, the two audio data packets, and a frame check sequence, and wherein the digital receiver of the receiver unit verifies each received data packet by using a frame check sequence.*

*28. The method of claim 26, wherein the receiver unit is electronically coupled to or integrated in a hearing aid, headphone, or earphone.*

*29. A method for providing sound, the method comprising:*

*receiving an audio signal;*

*converting the audio signal to digital audio packets;*

*transmitting wirelessly the digital audio packets to a receiver unit,*

*wherein the transmitting further includes transmitting a first digital audio packet on a first frequency in a first time slot of a time-slotted frame,*

*wherein the transmitting further includes transmitting a second digital audio packet on a second frequency in a second time slot of the time-slotted frame, and*

*wherein the first digital audio packet and the second digital audio packet include the same audio information and are transmitted in subsequent slots of the time-slotted frame.*

*30. The method of claim 29, the method further comprising:*

*determining an expected arrival time when the first digital audio packet is expected to arrive;*

*determining a time when the receiver unit will start listening by subtracting a guard period from the expected arrival time; and*

*in response to determining the time when the receiver unit will start listening, waking up the receiver unit to start listening at the time.*

*31. The method of claim 29, the method further comprising:*

*determining that the first digital audio packet has been correctly received;*

*in response to determining the first digital audio packet has been correctly received, sleeping during the transmission of the second digital audio packet.*

*32. The method of claim 29, the method further comprising:*

*in response to determining the first digital audio packet was not received, switching the receiver unit to receive the second digital audio packet on the second frequency and waiting for the second digital packet.*

*33. The method of claim 29, wherein the receiver unit is electronically coupled to or integrated into a hearing aid or headphone.*

*34. The method of claim 29, wherein the time-slotted frame includes a zero time slot, wherein the zero time slot includes a beacon packet, and wherein the beacon packet includes data for synchronizing.*

*35. A non-transitory computer-readable medium storing instructions, which when executed by a device, cause the device to perform operations for providing audio to multiple receivers, the operations comprising:*

*receive an audio signal;*

*convert the audio signal to digital audio packets;*

*transmit wirelessly the digital audio packets to a receiver unit,*

*wherein the transmitting further includes transmitting a first digital audio packet on a first frequency in a first time slot of a time-slotted frame,*

*wherein the transmitting further includes transmitting a second digital audio packet on a second frequency in a second time slot of the time-slotted frame, and*

*wherein the first digital audio packet and the second digital audio packet include the same audio information and are transmitted in subsequent slots of the time-slotted frame.*

*36. The non-transitory computer readable medium of claim 35, the operations further comprising:*

*determine an expected arrival time when the first digital audio packet is expected to arrive;*

*determine a time when the receiver unit will start listening by subtracting a guard period from the expected arrival time; and*

*in response to determining the time when the receiver unit will start listening, wake up the receiver unit to start listening at the time.*

*37. The non-transitory computer readable medium of claim 35, the operations further comprising:*

*determine that the first digital audio packet has been correctly received;*

*in response to determining the first digital audio packet has been correctly received, sleep during the transmission of the second digital audio packet.*

*38. The non-transitory computer readable medium of claim 35, the operations further comprising:*

*in response to determining the first digital audio packet was not received, switch the receiver unit to receive the second digital audio packet on the second frequency and wait for the second digital packet.*

*39. The non-transitory computer readable medium of claim 35, wherein the receiver unit is electronically coupled to or integrated in a hearing aid, earphone, or headphone.*

*40. The method of claim 26, wherein the transmission unit transmits each audio data packet three times in separate slots of the time-slotted frame.*

* * * * *